US012761541B2

(12) United States Patent
Schleith

(10) Patent No.: US 12,761,541 B2
(45) Date of Patent: Oct. 13, 2026

(54) STRIPE PROJECTION SYSTEM

(71) Applicant: Carl Zeiss Industrielle Messtechnik GmbH, Oberkochen (DE)

(72) Inventor: Christian Schleith, Oberkochen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 274 days.

(21) Appl. No.: 18/516,758

(22) Filed: Nov. 21, 2023

(65) Prior Publication Data

US 2024/0168369 A1 May 23, 2024

(30) Foreign Application Priority Data

Nov. 21, 2022 (DE) ..................... 10 2022 130 735.2

(51) Int. Cl.
*G03B 21/54* (2006.01)
*G01B 11/25* (2006.01)

(52) U.S. Cl.
CPC ............ *G03B 21/54* (2013.01); *G01B 11/254* (2013.01)

(58) Field of Classification Search
CPC ........ G03B 21/54; G01B 11/254; G01B 11/25
USPC ............................................................ 353/97
See application file for complete search history.

(56) References Cited

U.S. PATENT DOCUMENTS

2014/0081459 A1 3/2014 Dubois et al.
2015/0281671 A1* 10/2015 Bloom ............... G01B 11/2527 348/46
2016/0202051 A1* 7/2016 Heist .................. G01B 11/2545 356/610
2018/0112975 A1* 4/2018 Winkelbach ......... G01B 11/254

FOREIGN PATENT DOCUMENTS

DE 4436500 A1 5/1995
DE 19855324 A1 * 6/2000 ............. G01B 11/25
DE 102008038256 A1 2/2010
DE 102016113228 A1 * 1/2018 ........... H04N 13/239
EP 2986932 B1 9/2017

OTHER PUBLICATIONS

Cunwei Lu and Genki Cho, "Practical 3-D Shape Measurement Using Optimal Intensity-Modulated Projection and Intensity-Phase Analysis Techniques," 18th International Conference on Pattern Recognition (ICPR'06), Hong Kong, China, 2006, pp. 870-873, doi: 10.1109/ICPR.2006.940. (Year: 2006).*
Office Action issued in German Patent Application No. DE 10 2022 130 735.2, dated Jul. 7, 2023 (from which this application claims priority) and English language translation thereof.

* cited by examiner

*Primary Examiner* — Magda Cruz
(74) *Attorney, Agent, or Firm* — Ewers IP Law PLLC; Falk Ewers

(57) ABSTRACT

A stripe projection system for three-dimensionally capturing the surface of a measurement object includes a projector configured to project a stripe pattern onto the measurement object and a digital camera for capturing the stripe pattern. The projector includes a binary amplitude mask having transparent and opaque regions. The amplitude mask has first stripe regions which extend in a first direction and in which the proportion of the opaque and of the transparent area proportions varies depending on a position in a second direction. In this case, it is provided that the first stripe regions each form a transition region between continuous opaque or transparent stripes extending in the first direction and alternate with these stripes in the second direction.

20 Claims, 5 Drawing Sheets

FIG. 2
Related Art
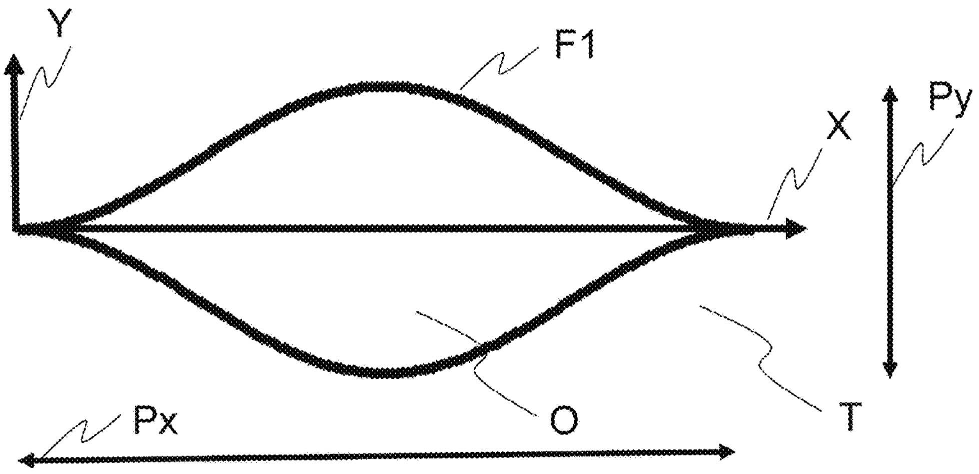
Related Art
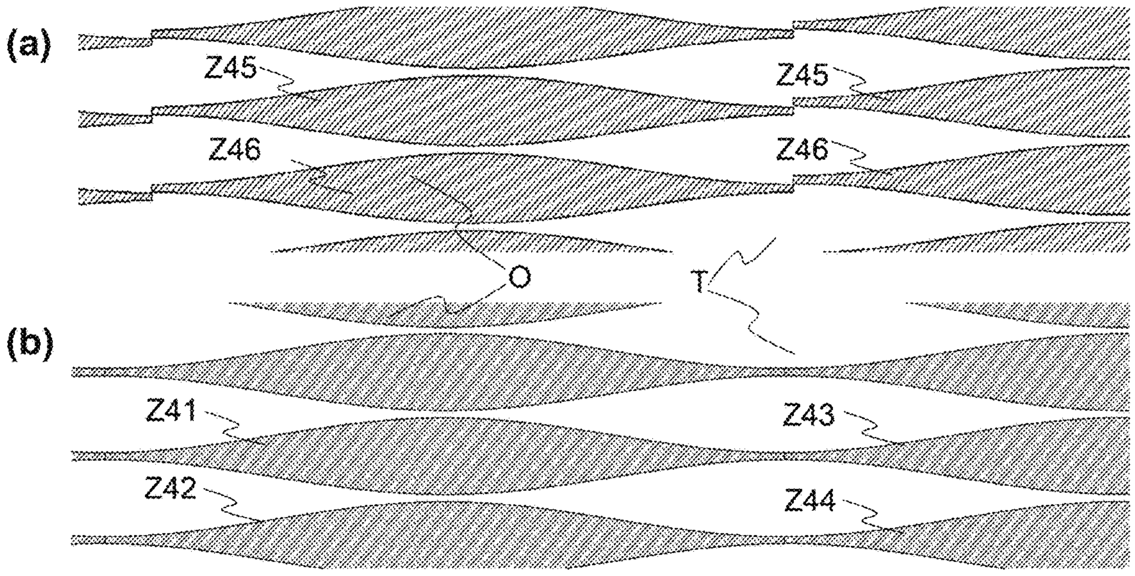
FIG. 3

FIG. 4
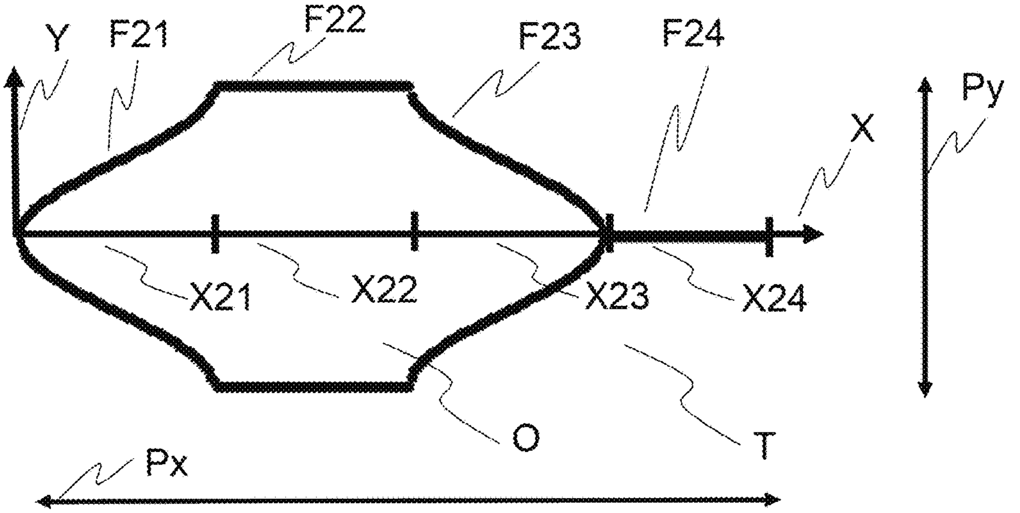
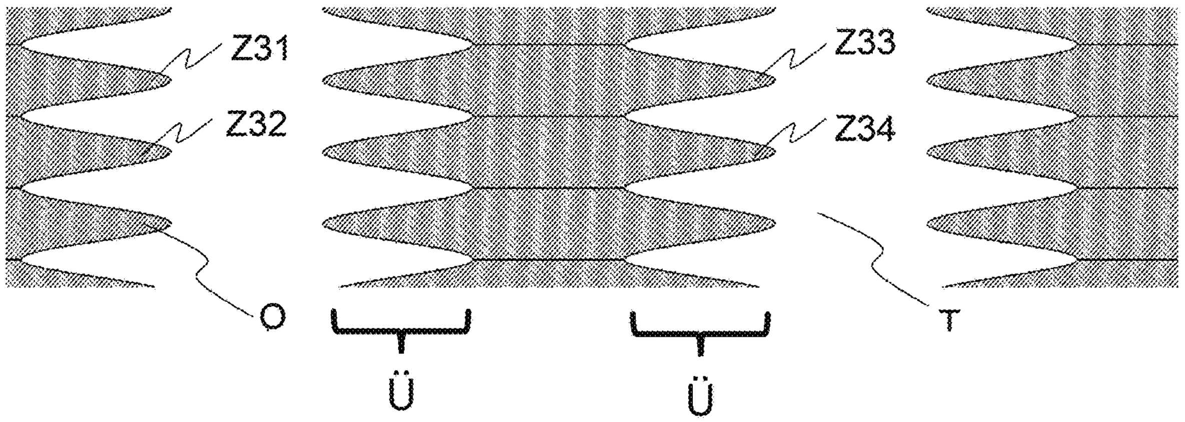
FIG. 5

STRIPE PROJECTION SYSTEM

CROSS REFERENCE TO RELATED APPLICATIONS

This application claims priority to German patent application DE 10 2022 130 735.2, filed Nov. 21, 2022, the entire content of which is incorporated herein by reference.

TECHNICAL FIELD

The present disclosure relates to a stripe projection system for three-dimensionally capturing the surface of a measurement object, including a projector for projecting a stripe pattern onto the measurement object and a digital camera for capturing the stripe pattern.

BACKGROUND

Stripe projection is a common method for capturing the surface data of an object. In this case, a projector projects a periodic intensity distribution, e.g., a sine pattern, onto the object to be captured. The object and the intensity distribution are recorded with a camera. The periodic intensity distribution on the object to be captured or on the camera image is also referred to hereinafter as stripe pattern. Depending on the shape of the object, the stripe pattern is deformed in comparison with the intensity distribution projected onto a planar surface (the stripe pattern, e.g., a sine pattern, is maintained locally, however). The viewing directions of camera and projection system are arranged at the so-called triangulation angle. The 3-dimensional shape of the surface can be reconstructed from the deformation of the stripe pattern.

A high-precision method for reconstructing the surface data of the object to be captured with maximum spatial resolution is the phase shift method. Here, a sine pattern is projected onto the object. By determining the phase of the sine for each location of the object to be captured, it is possible to achieve lateral resolutions that are significantly below the period of the intensity distribution. It is then dependent on the size of the camera pixels, on the imaging scale and on the quality of the captured sine pattern—specifically on the noise and contrast thereof. The contrast of a periodic intensity distribution with maximum I_max and minimum I_min is defined as $K=(I_{max}-I_{min})/(I_{max}+I_{min})$. In order to exactly determine the phase angle at an arbitrary location x of the object to be captured, the temporal phase shift method involves progressively shifting the periodic intensity distribution by a fraction of the period during a plurality of recordings and determining the phase of the projected sine pattern at the location x from the brightness differences on the respective images. The spatial phase shift method involves determining the phase angle from the brightness differences at adjacent locations of an image.

Various methods are known for generating the desired periodic intensity distribution on the object to be captured and ultimately on the camera image. DE19855324 (method for projecting periodic intensity profiles with binary amplitude masks) gives a comprehensive overview of the related art and presents a novel method: A periodic intensity profile with sinusoidal modulation in the x-direction and constant intensity in the y-direction is intended to be projected onto the object to be captured. This one-dimensionally modulated intensity profile with a sinusoidal intensity progression in the x-direction is coded by a binary amplitude mask which is structured periodically or quasi-periodically in both spatial directions. The binary amplitude mask is also referred to hereinafter as a grating. A quasi-periodic amplitude mask is present when its period continuously changes slightly in one or both spatial directions Px and/or Py. A significant change then occurs only over very many grating periods and at each location of the grating the structure is quasi-identical over some periods. For a stripe pattern with a constant period, too, Px and Py may vary locally, e.g., owing to a variable imaging scale as a result of the use of the Scheimpflug method for the projection.

The local period of the amplitude mask in the x-direction Px with spatial frequency $Vx=1/Px$ is within the spatial resolution capability or transfer range of the projection optical unit and corresponds (taking into account the imaging scale) to the period of the desired intensity distribution on the object to be captured or on the camera image. The local period of the amplitude mask in the y-direction Py corresponds to a spatial frequency $Vy=1/Py$ outside the spatial resolution capability or transfer range of the projection optical unit. An average brightness—integrated over a plurality of periods in the y-direction—is transferred here.

A periodic grating is constructed from identical building blocks having dimensions Px and Py in the x- and y-directions, the so-called basic cell. For a quasi-periodic grating, the size (Px, Py) and the position of the basic cell in both or one of the two spatial directions may vary over the grating with a mathematical transformation and thus be adapted to the respective projection geometry. In this regard, the grating can be adapted, e.g., to a variable imaging scale that arises from a projection under the Scheimpflug condition.

FIG. 2 shows a basic cell of a grating for projecting a sine pattern. The basic cell contains a binary pattern. The boundaries between transparent (T) and opaque (O) regions are described by a mathematical function (F1); the ordinate (X) runs along the x-direction and the abscissa (Y) along the y-direction. In this case, F1 is a sine function, i.e., within a period (Px) the proportion of the opaque region varies sinusoidally along the x-direction.

FIG. 3 shows a corresponding amplitude grating. The size and position of the basic cells (Z41-Z46) are adapted to the specific projection geometry, specifically in this case to an imaging scale that changes in the x-direction as a result of the Scheimpflug condition. FIG. 3(*a*) shows, e.g., a detail from an amplitude grating in which both Px and Py are adapted to a projection imaging scale that varies in the x-direction, whereas in FIG. 3(*b*) only Px is varied and Py remains constant.

Disadvantages of the Related Art

Contrast reduction as a result of the sampling rate of the camera.

When the stripe pattern is recorded by a digital camera, the intensity distribution projected onto the object to be captured is sampled pixelwise. For each camera pixel, the intensity distribution is averaged over the region captured on the object by the respective camera pixel. If a sine pattern is projected, for example, as a result the contrast of the intensity distribution captured by the camera is lower than the contrast of the pattern projected onto the object. The extent to which the contrast decreases depends on the number of camera pixels which capture one period of the stripe pattern. This ratio is called the sampling rate. If one period of the stripe pattern is captured by 4 camera pixels, for example, the contrast decreases to approximately 90% as a result of the pixelwise sampling. A reduced contrast on the camera image leads to a poorer measurement accuracy in high-resolution stripe projection methods such as, e.g., the spatial or temporal phase shift method.

Production Engineering Disadvantages

The typical structure sizes of the binary amplitude masks described lie in the range of from a few 100 nanometers (nm) to a few micrometers (μm). They are typically produced by the micro structuring of chromium-coated glass substrates, with lithographic and wet-chemical methods. The resolution limit of this production process—referred to as the minimum line width—lies in the range of a few 100 nm, that is to say that structures smaller than 300 nm, for example, cannot be produced. From a production engineering standpoint, it is thus not possible to place the basic cells directly against one another in the y-direction. Structures below the minimum line width would then arise again in the interspaces between the points of contact of two sine curves. In other words, as illustrated in FIG. 3, the basic cells have to be arranged at a distance larger than the line width, in this example 300 nm, in the y-direction, and, e.g., for Py=3 μm a maximum proportion of the opaque region of 90% is then obtained. As illustrated in FIG. 3, the tail region, too, of the sine pattern must always have a certain residual structure width, e.g., 300 nm. Consequently, the minimum proportion of the opaque region is not less than 10% anywhere. That has direct consequences for the maximum contrast achievable during the projection: During the projection, an intensity value corresponding to the integration in the y-direction over the corresponding location of the amplitude mask arises in the projected pattern at each point of the object. In the case of the gratings from FIG. 3, as a result of the production engineering limitations, the projected sine pattern attains only a contrast of $K=(90-10)/(90+10)=0.8$ or 80% between the bright and dark regions. A reduced contrast on the measurement object or the camera image leads to a poorer measurement accuracy in high-resolution stripe projection methods such as, e.g., the spatial or temporal phase shift method.

Moreover, a 10% lower maximum intensity is attained. That has to be compensated for by longer exposure times of the camera or smaller f-numbers of the projection optical unit or camera optical unit and thus a smaller depth of field range and measurement range and ultimately leads to poorer performance characteristic figures of the measurement system, such as longer measurement times or a smaller measurement volume.

Decrease in contrast as a result of the limited resolution of the projection optical unit in the x-direction.

In order to achieve a high lateral resolution during stripe projection, a stripe pattern is often projected with a correspondingly high spatial frequency. If the local period of the grating to be projected Px (in the direction of the desired periodic intensity distribution) becomes very small, this leads to a decrease in the contrast of the stripe pattern owing to the limited resolution capability of the projection optical unit. In metrological applications, that is often already the case at spatial frequencies that are significantly below the resolution limit of lenses designed specifically for high resolution capacities (typically 100 line pairs/mm). Besides the high costs for such high-resolution lenses, the transfer performance (the resolution capability) often competes directly with other system parameters. In this regard, e.g., focal length and aperture stop have to be adapted to the requirement for a specific working distance or depth of field range and cannot be chosen according to a maximum transfer function (resolution). A reduced contrast on the measurement object or the camera image leads to a poorer measurement accuracy in high-resolution stripe projection methods.

SUMMARY

It is an object of the present disclosure to provide an improved stripe projection system which provides a higher contrast of the captured pattern.

The object is achieved with a stripe projection system, and a method for operating a stripe projection system, as described herein.

The present disclosure provides a stripe projection system for three-dimensionally capturing the surface of a measurement object, including a projector for projecting a stripe pattern onto the measurement object and a digital camera for capturing the stripe pattern, wherein the projector includes a binary amplitude mask having transparent and opaque regions, and wherein the amplitude mask has first stripe regions which extend in a first direction and in which the proportion of the opaque and of the transparent area proportions varies depending on a position in a second direction. In this case, it is provided that the first stripe regions each form a transition region between continuous opaque or transparent stripes extending in the first direction and alternate with these stripes in the second direction.

The configuration of the amplitude mask according to an aspect of the disclosure takes account of the fact that the intensity distribution generated on the measurement object by the projector is intended to be resolved by pixels having a finite extent, and the desired, in particular sinusoidal, intensity distribution is intended to arise only after the averaging over the width of such an extensional pixel. The projected pattern can therefore have an intensity deviation which deviates from the desired, in particular sinusoidal, intensity distribution and by way of which the contrast of the intensity distribution that is captured in the sensor and arises after the averaging over the width of a pixel can be increased.

As a result of the projection of the continuous opaque and transparent stripes, the projected pattern typically has regions which have a maximum or minimum intensity over a certain width in the second direction, i.e., the maxima and minima of the projected pattern are widened relative to a sine pattern. After the averaging over the width of a pixel, the contrast between minima and maxima of the captured intensity distribution is thereby increased.

Furthermore, the configuration according to an aspect of the disclosure has the advantage that the minimum line width governed by production, which further reduced the maximum or minimum intensity in the prior art, no longer plays a disadvantageous role because the pattern of the binary amplitude mask has no opaque proportions in the region of the continuous transparent stripes, and vice versa, and therefore no opaque or transparent lines with continuity in the second direction are present.

In accordance with one possible configuration of the present disclosure, it is provided that the proportion of the opaque and of the transparent area proportions increases or decreases continuously over the extension of the respective first region in the second direction taking into account the resolution of the projection and camera optical units. The first stripe regions therefore have a function comparable to the basic cells of the related art, except that the proportion of the opaque and of the transparent area proportions does not increase or decrease continuously over the entire period length, rather provision is made of minima and maxima which are extended between regions with a continuous increase or decrease, said minima and maxima being formed by the continuous opaque and transparent stripes.

In a second independent aspect, the present disclosure includes a stripe projection system for three-dimensionally capturing the surface of a measurement object, including a projector for projecting a stripe pattern onto the measurement object and a digital camera for capturing the stripe pattern. The projector includes a binary amplitude mask which is structured periodically or quasi-periodically in a first and a second direction by juxtaposition of basic cells, wherein the basic cells have transparent and opaque regions. The structure period in the first direction along the stripes of the stripe pattern is smaller than the resolution of the overall system. The basic cells are partly opaque and partly transparent over their height in the first direction at least in a first region, wherein the respective proportion varies depending on the position in the second direction. The disclosure provides for the basic cells to have at least one second region in which they are transparent over their entire height in the first direction.

In accordance with the second aspect, too, the configuration of the basic cells according to the disclosure takes account of the fact that the intensity distribution generated on the measurement object by the projector is intended to be resolved by pixels having a finite extent, and the desired, in particular sinusoidal, intensity distribution must arise only after the averaging over the width of such an extensional pixel. Therefore, the projected pattern can have an intensity distribution which deviates from the desired, in particular sinusoidal, intensity distribution, and can have in particular regions which are generated by projection of the second regions, and which have an intensity of 100% over a certain width in the second direction. Furthermore, the configuration according to an aspect of the disclosure has the advantage that the minimum line width governed by production, which further reduced the maximum intensity in the related art, no longer plays a disadvantageous role because the pattern of the binary amplitude mask has no opaque proportions at all in the second region, and therefore no lines with continuity in the second direction are present.

In accordance with one possible configuration, it is provided that the basic cells have at least one third region in which they are opaque over their entire height in the first direction. The same mechanisms as for the second region are utilized here, too, namely that the desired, in particular sinusoidal, intensity distribution must arise only after the averaging over the width of such an extensional pixel. In addition, the disadvantages governed by production engineering in the prior art are avoided here, too, since the opaque regions of two basic cells directly adjoin one another in the first direction, without a continuous transparent line remaining between the basic cells.

In accordance with one possible configuration, it is provided that a basic cell includes two first regions, one second region and one third region, with one first region being arranged between the second and third regions. Since the arrangement of the basic cell in relation to the resulting stripe pattern is ultimately merely a question of definition, the remaining first region can be arranged on the outside next to either the second region or the third region. In the resulting grating of the binary amplitude mask, second and third regions thus respectively alternate, with first regions respectively being arranged between them.

In accordance with one possible configuration, it is provided that the opaque proportion in the first region varies continuously depending on the position in the second direction, in particular from a proportion of 100% to a proportion of 0%. In particular, the profile of the proportion of the opaque proportion depending on the position in the second direction is chosen such that the desired profile of the intensity distribution arises taking into account the integration over the pixel width and typically also the unsharpness in the image from the camera that arises as a result of the projection and imaging.

In accordance with one possible configuration, it is provided that the opaque proportion in the first region, depending on the position in the second direction, has an arc-sinusoidal or arc-cosinusoidal profile. As a result, a virtually sinusoidal profile arises in the image from the camera just as a result of the pixel sampling. Given suitable system design, in particular in respect of the sampling rate of the digital camera and the resolution capability of the projection and camera optical units, the difference relative to an ideal sine in the result image is no longer measurable.

In accordance with one possible configuration, it is provided that the periodic intensity distribution generated on the camera image is (locally) constant in one direction and a sine function in the second direction, and the mathematical function of the amplitude mask is chosen such that it is divided into m regions, wherein m is the number of pixels of the digital camera which captures a period of the projected intensity pattern (sampling rate) and the function is continuous and has the value 1 in one of the regions (i.e., the basic cell is opaque here) and has the value 0 in one of the regions (i.e., it is transparent here) and has an arc-sinusoidal or arc-cosinusoidal profile therebetween.

The second aspect is initially independent of the first aspect described above. The two aspects are typically combined, however, wherein the second and third regions of the second aspect correspond to the continuous transparent and opaque stripes in accordance with the first aspect.

In particular, therefore, in accordance with the first aspect, the binary amplitude mask can be structured periodically or quasi-periodically in the first and the second direction by juxtaposition of basic cells, wherein the structure period in the first direction along the stripes of the stripe pattern is smaller than the resolution of the overall system, and wherein the basic cells are partly opaque and partly transparent over their height in the first direction in the first stripe region, wherein the respective proportion varies depending on the position in the second direction.

Typical configurations of both the first aspect and the second aspect are described in larger detail below.

In accordance with one possible configuration, it is provided that the width of the continuous transparent and/or opaque stripes or of the second and/or third region in the second direction in the image captured by the digital camera substantially corresponds to the width of a pixel of the digital camera. As a result, a pixel arranged in the second direction exactly centrally with respect to the projection of the respective continuous transparent or opaque stripe or second or third region will in each case capture an intensity of 100% or 0% despite the extent of said pixel. The intensity and contrast losses that occurred in the prior art on account of the integration over the width of the pixels are therefore avoided.

The fact that the width of the continuous transparent and/or opaque stripes or of the second and/or third region in the second direction in the image captured by the digital camera substantially corresponds to the width of a pixel of the digital camera typically means here that the width of the continuous transparent and/or opaque stripes or of the second and/or third region in the second direction in the image captured by the digital camera is between 50% and 200% of the width of a pixel of the digital camera, typically between 80% and 120% of the width of a pixel of the digital camera. In particular, the width of the continuous transparent and/or opaque stripes or of the second and/or third region in the second direction in the image captured by the digital camera can correspond to the width of a pixel of the digital camera, i.e., can be imaged onto the width of a pixel.

For the functioning of the present disclosure, what is crucial is indeed the actual extension of the camera pixels in the second direction, and not the pitch of the camera chip. However, the coverage of the area with pixels is very high in customary camera chips, and so this results in hardly any difference.

In accordance with one possible configuration, it is therefore provided that the width of the continuous transparent and/or opaque stripes or of the second and/or third region in the second direction is 1/m of the period length of the stripe pattern or of the width of the basic cell, wherein m is the number of pixels of the digital camera which capture a period of the projected intensity pattern in the second direction.

The fact that the width of the continuous transparent and/or opaque stripes or of the second and/or third region in the second direction is approximately 1/m of the period length of the stripe pattern or of the width of the basic cell typically means here that the width of the continuous transparent and/or opaque stripes or of the second and/or third region in the second direction is between 50% and 200% of a proportion 1/m of the period length of the stripe pattern or of the width of the basic cell, typically between 80% and 120%. In particular, the width of the continuous transparent and/or opaque stripes or of the second and/or third region in the second direction can be 1/m of the period length of the stripe pattern or of the width of the basic cell.

Insofar as the size of the individual regions of the pattern is defined with reference to a projection onto the camera chip in the context of the present disclosure, this definition is given for the target object distance of the stripe projection system, which typically corresponds to the distance with the best imaging sharpness and/or the central plane of the depth of focus.

In accordance with one possible configuration, it is provided that the number m of pixels of the digital camera which capture a period of the projected intensity pattern in the second direction lies in the range of 3 to 20. In this case, three pixels per period constitutes the theoretical lower limit which still allows an assignment of the pixels to the sine pattern. However, customary technical realizations usually use at least four pixels per period. In the event of more than 20 pixels per period being used, the present disclosure largely loses its significance since the effects turn out only to be very small.

In accordance with one possible configuration of the present disclosure, it is provided that the width of the continuous opaque and/or transparent stripes or of the second and/or third region in the second direction is at least 1/m of the period length of the stripe pattern or of the width of the basic cell, wherein m is less than or equal to 20, typically less than or equal to 10, more typically less than or equal to 5.

In accordance with one possible configuration of the present disclosure, it is provided that the width of the continuous opaque and/or transparent stripes or of the second and/or third region in the second direction is a maximum of 1/n of the period length of the stripe pattern or of the width of the basic cell, wherein n is larger than 3.

In accordance with one possible configuration, it is provided that as a result of the division of the stripe pattern into continuous opaque and transparent stripes and intervening transition regions or as a result of the division of the basic cells into opaque and transparent regions together with the sampling rate of the digital camera and the resolution capability of the projection and camera optical units, locally the desired periodic intensity distribution is generated on the camera image with the maximum possible contrast.

In accordance with one possible configuration, it is provided that the periodic intensity distribution generated on the camera image is locally constant in one direction and a sine function in the second direction.

In accordance with one possible configuration, it is provided that the basic cells in accordance with the second aspect each have a continuous opaque or transparent region. This affords the advantages already described above with regard to avoiding production-dictated losses in contrast or maximum intensity.

In accordance with a first exemplary embodiment, the transition regions are formed by the position of the boundary lines between the continuous opaque and transparent stripes varying in the second direction in the region of the first stripe regions depending on the position in the first direction.

In particular, the variation of the position of the boundary lines can correspond to the width of the first stripe regions.

In one exemplary configuration, the boundary lines between the continuous opaque and transparent stripes in the region of the first stripe regions have a wave shape.

In particular, the variation in the position of the boundary lines is implemented such that it is no longer resolved by the projection and camera optical units in the first direction and therefore does not lead to a variation in the brightness in the first direction on the camera chip.

In particular, the wavelength in the first direction can be smaller than the resolution of the projection and camera optical units. Typically, the wave shape is sinusoidal.

In the first exemplary embodiment, the amplitude mask typically exclusively includes the continuous transparent and opaque stripes, wherein the transition regions or the first stripe regions are formed by the profile of the boundary lines between the continuous opaque and transparent stripes.

In accordance with a second exemplary embodiment, by contrast, it is provided that the transition regions are formed by a pattern of discrete opaque or transparent elements being provided between the continuous opaque and transparent stripes.

Typically, the area proportion of the opaque or transparent elements decreases or increases continuously in the second direction taking into account the resolution of the projection and camera optical units.

In accordance with a first variant of the second exemplary embodiment, the discrete opaque or transparent elements are stripes, wherein the stripes typically extend in the first direction and have a thickness that becomes smaller or larger from stripe to stripe in the second direction.

In accordance with a second variant of the second exemplary embodiment, the discrete opaque or transparent elements are points, wherein the points typically become smaller or larger in the second direction or the density of the points becomes smaller or larger in the second direction.

The pattern is typically implemented such that it is no longer resolved by the projection and camera optical units and therefore on the camera chip does not lead to a variation in the brightness in the first direction, and/or does not lead to a continuously decreasing or increasing brightness in the second direction.

In accordance with one possible configuration, it is provided that the opaque and transparent regions within the amplitude mask each have a width in the second direction which allows production by lithographic processes, without the occurrence of any production-dictated impairment in the contrast of the projected intensity distribution and that captured by the camera.

In accordance with one possible configuration, it is provided that the binary amplitude mask is quasi-periodic and the alignment and/or period length of the grating or the size and the position of its basic cells, in both or one of the two directions, varies over the grating and is thereby typically adapted to the respective projection geometry.

In accordance with one possible configuration, the stripe projection system has an evaluation unit, which evaluates the stripe pattern captured by the digital camera and determines the three-dimensional shape of the measurement object therefrom.

In accordance with one possible configuration, it is provided that the evaluation and in particular the determination of the position of the stripe pattern in the second direction is effected by way of a spatial phase shift.

The three-dimensional shape of the measurement object is typically determined by triangulation.

In accordance with one possible configuration, the stripe projection system has a movement unit, which guides the stripe projection system along that surface of the measurement object which is to be measured, wherein this involves a robotic arm, in particular.

The present disclosure furthermore encompasses a method for producing an amplitude mask for a stripe projection system, wherein production is effected by way of a lithographic process, in particular a photolithographic process.

The present disclosure furthermore includes a method for operating a stripe projection system such as has been described above, including the following steps:

projecting a stripe pattern onto a measurement object,
capturing the stripe pattern, and
evaluating the captured stripe pattern.

In accordance with one possible configuration, it is provided that the method is used for capturing surface defects and/or shape deviations of sheet metal parts. In particular, the latter can be bodywork parts of vehicles.

In accordance with one possible configuration, it is provided that the evaluation of the captured stripe pattern is effected by way of a spatial phase shift.

In accordance with one possible configuration, it is provided that the stripe projection system is guided along that surface of the measurement object which is to be measured, in order to measure said measurement object.

Therefore, as described above, the present disclosure realizes a binary amplitude grating which, together with the sampling rate of the digital camera and the resolution capability of the projection and camera optical units, generates a predefined one-dimensional, periodic intensity distribution on the camera image with maximum contrast. In this case, in particular, a decrease in contrast as a result of the sampling rate of the camera is prevented or compensated for. A decrease in contrast governed by production engineering is likewise avoided to the greatest possible extent. To a certain extent, it is also possible to compensate for the decrease in contrast as a result of the limited resolution capability of projection and camera optical units in the second direction.

BRIEF DESCRIPTION OF THE DRAWINGS

The disclosure will now be described with reference to the drawings wherein:

FIG. 2 shows a basic cell in accordance with the related art, FIG. 3 shows a binary amplitude mask in accordance with the related art, FIG. 4 shows a basic cell according to a first exemplary embodiment of the present disclosure, FIG. 5 shows an amplitude mask according to a first exemplary embodiment of the present disclosure.

DESCRIPTION OF EXEMPLARY EMBODIMENTS

Figure 1:
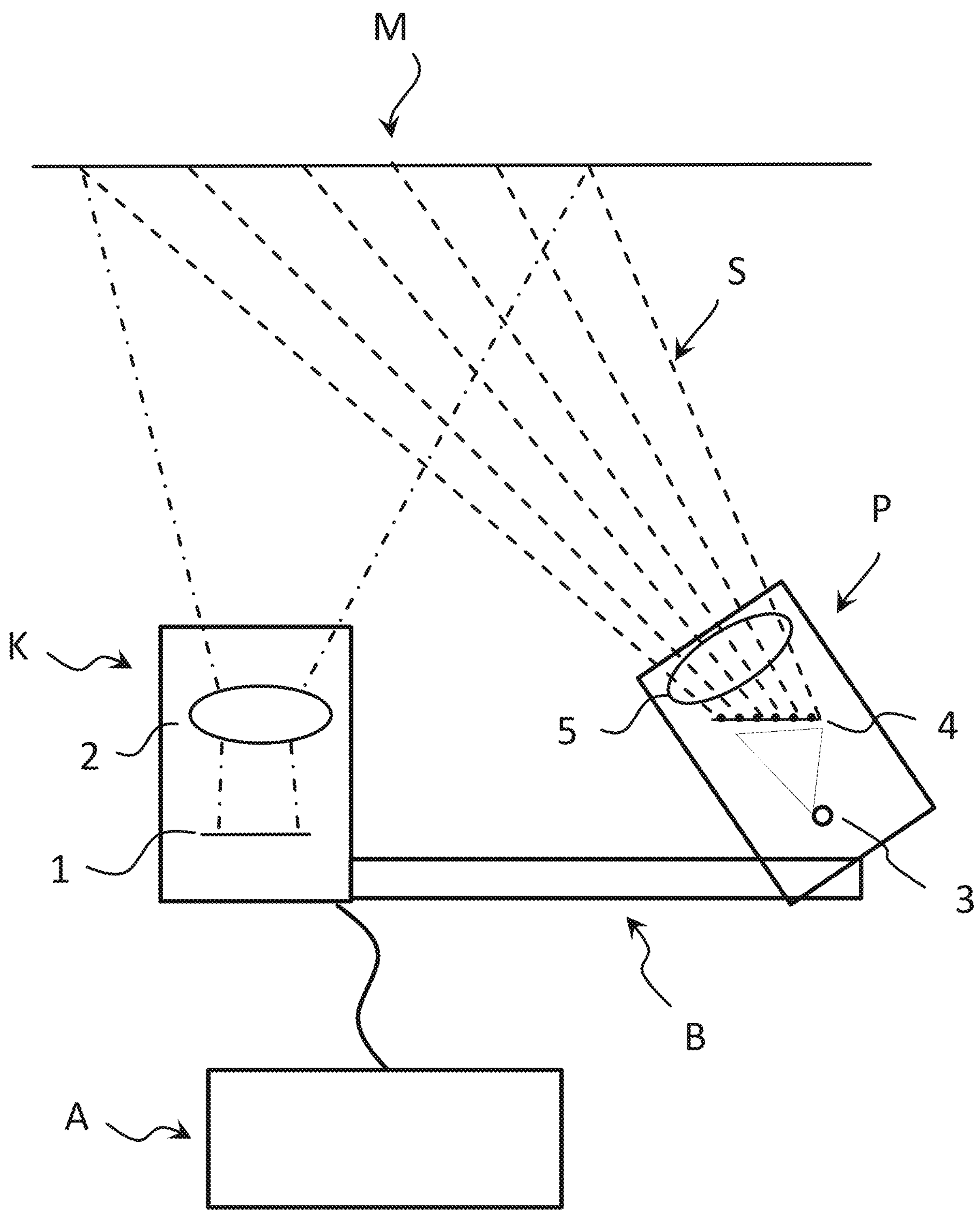
FIG. 1 shows a schematic illustration of a stripe projection system according to one exemplary embodiment of the disclosure.

FIG. 1 shows a stripe projection system according to one exemplary embodiment of the disclosure in a schematic illustration.

The stripe projection system has a projector P, which projects a stripe pattern S onto a measurement object M. Furthermore, a digital camera K is provided, which records the stripe pattern S generated on the measurement object M. The recording is evaluated by an evaluation unit A. Projector P and camera K can be arranged on a base at a certain distance from one another and at a triangulation angle.

The projector P has a light source 3, a binary amplitude mask 4 and a projection optical unit 5, and therefore images the pattern of the amplitude mask 4 onto the measurement object M. The camera K has an optical unit K, which images the pattern onto a camera chip 1. The binary amplitude mask 4 has a static pattern of transparent and opaque or non-transparent regions. The amplitude mask 4 is for example a microstructured chromium-coated glass substrate produced with lithographic and wet-chemical methods, for example.

In the context of the disclosure, therefore, a static stripe pattern is projected onto the surface to be captured in order to determine the three-dimensional shape of the surface. This makes it possible to move the stripe projection system relative to the measurement object.

The present disclosure therefore typically employs a spatial phase shift, i.e., determines the phase angle from the differences in brightness at adjacent locations and in particular from the differences in brightness of the pixels of an image recorded by the digital camera. As a result, it is possible to determine the position of the stripe pattern or the phase angle of the stripe pattern with an accuracy which is significantly higher than the extension of the individual pixels.

In order to achieve a sufficiently high resolution, a very fine stripe pattern is typically used, the period of which is imaged onto only a few camera pixels of the camera of the measurement system. In particular, a period of the stripe pattern is imaged onto three to twenty pixels. On the binary amplitude mask, the stripe pattern can have for example between 10 and 500 lines per millimeter, typically between 50 and 200 lines per millimeter.

A sinusoidal intensity distribution of the projecting pattern was usually used in accordance with the related art, in which case the brightness captured by the individual camera pixels can be used to determine the position of the pixels relative to said sinusoidal intensity distribution. This type of evaluation here exploited the fact that a sinusoidal intensity distribution averaged over the width of a camera pixel also in turn produces a sine curve. From the brightness of a pixel, therefore, the position thereof relative to the sine curve was able to be deduced directly. However, the sine curve generated by the averaging over the width of the camera pixel loses amplitude, and so the contrast of the resulting image decreases.

The objective set by the disclosure, then, is to improve this contrast.

In this case, the grating is a pattern composed of transparent and non-transparent or opaque regions.

In accordance with the second aspect of the present disclosure, which is realized in the first exemplary embodiment, a basic cell Z is used which is repeated both along the stripes and in the wave direction perpendicular to the stripes (with possibly slight changes in size). In the direction of the stripes, the pattern is so fine that it is no longer resolved after the imaging of the projection and camera optical units and finally the sampling of the camera pixels, and therefore blurs in the stripe direction (the first direction of the present disclosure) to give a uniform intensity distribution. Perpendicular to the stripe direction (i.e., in the second direction of the present disclosure), said pattern generates the desired modulation.

In accordance with the related art, as shown in FIG. 2, the opaque region O of this basic cell had the shape of a line propagating in a direction Px perpendicular to the stripe direction Py, the thickness F1 of said line varying sinusoidally depending on the position in line direction Px. Owing to a minimum line width during the method for producing the pattern, as shown in FIG. 3, the line at its thinnest location was however still as wide as this minimum line width of the production method; therefore, the width never went completely to 0. Furthermore, even at the thickest location, the distance to the adjacent line in the stripe direction was not equal to 0, but rather here as well corresponded to the minimum line width, and so coverage of 100% was not achieved here either. Therefore, neither the transparent region T nor the opaque region O had a coverage of 100% in the first direction Py. The basic cells of the pattern in FIG. 3 are designated here by Z41 to Z46.

By contrast, in accordance with the second aspect, the stripe pattern according to the disclosure is formed from basic cells which take account of the fact that the resulting intensity distribution is ultimately intended to be resolved by pixels having a finite extent, and the sinusoidal intensity distribution must arise only after the averaging over the width of such an extensional pixel.

Therefore, as shown in FIG. 4, the basic cells in accordance with the second aspect have regions X22 in which the opaque region O has an extension F22 in the first direction Py of 100%, and/or regions X24 in which the opaque region O is interrupted and therefore has an extension F24 in the first direction Py of 100%, while the transparent region T has an extension in the first direction Py of 100%. In this case, the regions X22 and X24 have a width in the second direction Px approximately such that they correspond to the width of a pixel upon imaging onto the camera chip. As a result, a camera pixel arranged exactly centrally with respect to a maximum of the intensity distribution will record 100% of the brightness, and 0% at a minimum of the intensity distribution. The intervening first regions X21 and X23 have a varying proportion F21 and F23, respectively, of the opaque region O, which in turn results in a sinusoidal intensity distribution in the resulting image from the camera in the case of a corresponding shift of the camera pixel. In this case, the opaque region has a sine or cosine shape in the direction Py, and accordingly an arc-sine or arc-cosine shape in the direction Px.

In this case, the configuration of the basic cell can take account of the fact that the optical unit of the projection system and of the camera system also gives rise to a certain levelling of the pattern. The width of the regions X22 having an opaque proportion of 100% and X24 having an opaque proportion of 0% can therefore be chosen such that taking account of the projection properties of the projector and the camera, said regions generate on the camera chip in each case regions having an intensity of 100% and 0%, respectively, which are as wide as a camera pixel. Furthermore, taking account of the projection properties of the projector and the camera can also lead to a slight adaptation of the profile of the opaque proportion in the first regions X21 and X23.

FIG. 5 then shows a stripe pattern formed by a plurality of basic cells Z31 to Z34 on the binary amplitude mask in accordance with the second aspect or the corresponding first exemplary embodiment. Respective continuous stripes of opaque regions O and of transparent regions T therefore arise, wherein the position of the boundary between the opaque and transparent stripes varies in the second direction depending on the position in the first direction and the boundary has a wave-shaped profile.

Figure 6:
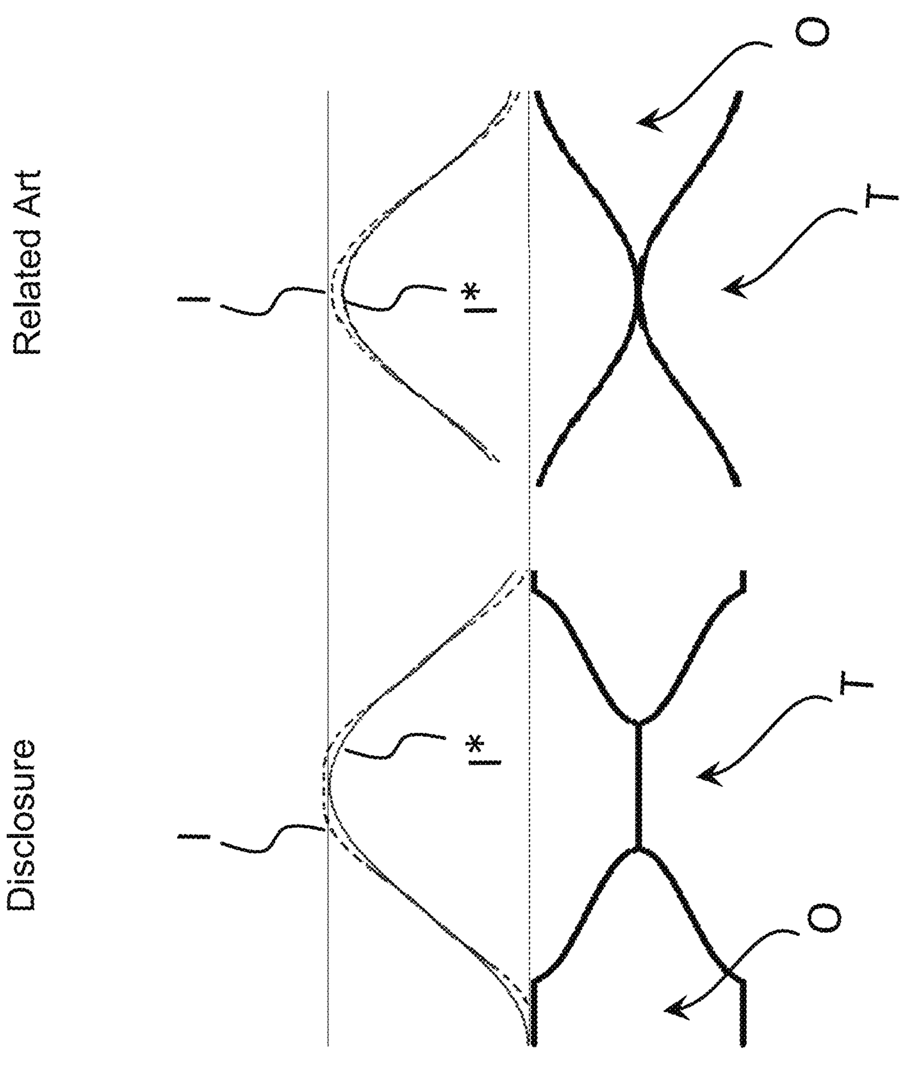
FIG. 6 shows, in a left-hand diagram, the intensity distribution that arises on the measurement object and after capture by the camera chip in the case of the basic cell—illustrated underneath—in accordance with one exemplary embodiment of the present disclosure, and, in the right-hand diagram for comparison, the intensity distribution that arises on the measurement object and after capture by the camera chip in the case of the basic cell—illustrated underneath—in accordance with the related art.

FIG. 6 shows the intensity profiles produced by the present disclosure (on the left) in comparison with those in accordance with the prior art (on the right).

The left-hand diagram illustrates the intensity distribution I that arises on the measurement object and the intensity distribution I* that arises after capture by the camera chip in the case of the basic cell—illustrated underneath—in accordance with the exemplary embodiment of the present disclosure. As evident from the intensity distribution I, the regions of the projected pattern with an intensity of 100% and 0% respectively extend over a certain width of the basic cell, which, however, owing to the imaging optical unit, is somewhat smaller than the width of the corresponding regions having an opaque proportion of 100% and 0% respectively in the basic cell of the binary phase mask, illustrated underneath. By contrast, the intensity distribution I* that arises in the image from the camera has a sine shape owing to the integration over the width of the pixels.

The right-hand diagram shows for comparison the intensity distribution I that arises on the measurement object and the intensity distribution I* that arises after capture by the camera chip in the case of the basic cell—illustrated underneath—in accordance with the related art. Here the intensity distribution I on the measurement object already has a sine shape, which, however, leads to a lower maximum intensity and a lower contrast in the case of the intensity distribution I* that arises in the image from the camera.

The present disclosure therefore increases the maximum intensity and contrast of the captured pattern without losses in quality in the case of the desired (sine) shape of said pattern.

The present disclosure, in accordance with the first aspect, can also be described without recourse to basic cells, or be implemented without such division.

Figures 7, 8:
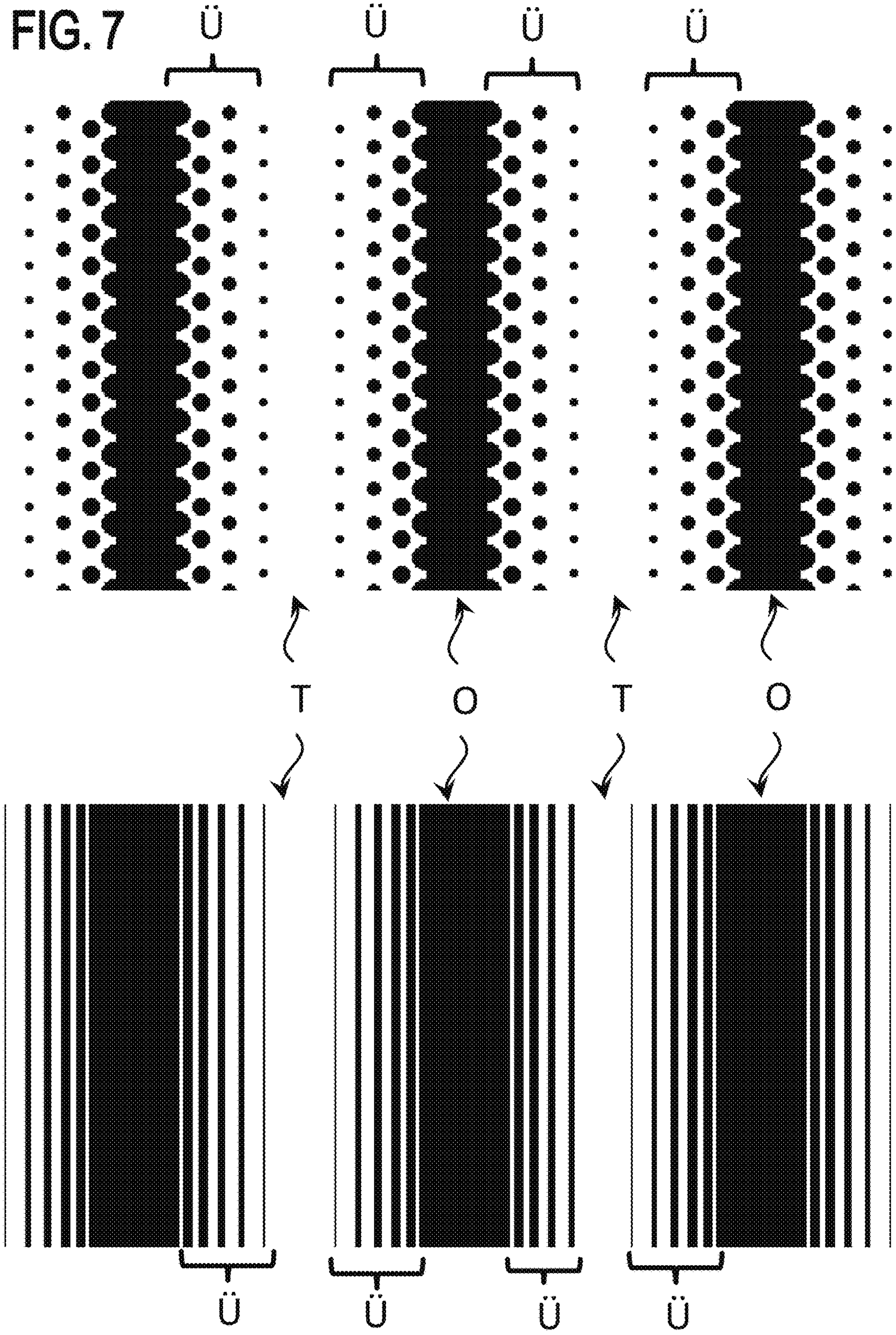
FIG. 7 shows an amplitude mask according to a second exemplary embodiment of the present disclosure.
FIG. 8 shows an amplitude mask according to a third exemplary embodiment of the present disclosure.

FIGS. 7 and 8 show two further exemplary embodiments of the present disclosure, which elucidate this since, in these exemplary embodiments, the division of the pattern of the amplitude mask into basic cells is manifested less markedly than in the first exemplary embodiment or is even no longer necessary from a conceptual standpoint.

In this case the amplitude mask, in accordance with the first aspect, has continuous stripes O which are opaque with continuity in the first direction and stripes T which are transparent with continuity in the first direction, between which respective transition regions U are provided, in which the proportion of the opaque and of the transparent area proportions changes in the second direction over a certain extension range. The transition regions U in this case correspond to the first region in accordance with the above-describe second aspect or first exemplary embodiment of the present disclosure, wherein the above-described first exemplary embodiment can also be described in the same way as a sequence of continuous opaque stripes O and transparent stripes T throughout in the first direction and transition regions U arranged between them. In the first exemplary embodiment, the transition regions are formed by the regions X21, X23 in which the proportion of the opaque and of the transparent area proportions changes depending on the second direction, or in which the boundary between the opaque and transparent stripes O and T varies and has a wave shape.

In the exemplary embodiments in FIGS. 7 and 8, by contrast, a configuration is used in which, in the transition regions U, provision is made of respective patterns of discrete opaque or transparent elements, i.e., patterns of mutually separate opaque or transparent elements on a transparent or opaque background, respectively. In this case, the patterns are configured such that the area proportion of the opaque or transparent elements changes in the second direction over the width of the transition regions U and forms a transition between the completely transparent stripes T and the completely opaque stripes O.

The pattern is configured here such that it is no longer resolved by the imaging optical unit of projector and camera and, therefore, on the camera chip in the first direction a constant intensity distribution is present and the intensity in the second direction changes continuously from maximum intensity to minimum intensity, or vice versa.

In the exemplary embodiment in FIG. 7, the pattern is formed by opaque points, the size and/or density of said points changing in the second direction.

In the exemplary embodiment in FIG. 8, the pattern is formed by opaque lines running in the first direction, the size and/or density of said lines changing in the second direction.

In both exemplary embodiments, a regular pattern is used which conceptually would still be divisible into basic cells, even if the pattern would allow a plurality of different extents of the basic cells in the first direction or, in FIG. 8, a constant pattern is used anyway in the first direction.

However, the present disclosure could also be realized by an irregular pattern for the transition region U, e.g., by virtue of the transition region being randomly opaquely and transparently pixelated, and only the average proportion of the opaque or transparent pixels increasing or decreasing in the second direction.

For the dimensioning of the transition regions U and in particular the width thereof in the second direction, the same explanation as has already been given above with regard to the first regions X21, X23 holds true for the first aspect of the present disclosure, the width of the basic cell in the second direction being replaced by the period length of the stripe pattern, which conceptually corresponds to said width.

Both aspects of the present disclosure allow a significant improvement in the contrast of the stripe pattern captured by the camera chip.

The stripe projection system can be used to capture surface defects and shape deviations of sheet-metal parts, in particular bodywork parts from the automotive industry. For this purpose, said system is guided along the sheet-metal part by way of a robot.

The stripe projection system can have for example a depth of field of between 5% and 20% of the object distance, for example 10%. In one possible exemplary embodiment, the depth of field can be for example +−2 cm given an object distance of approximately 40 to 50 cm.

It is understood that the foregoing description is that of the exemplary embodiments of the disclosure and that various changes and modifications may be made thereto without departing from the spirit and scope of the disclosure as defined in the appended claims.

What is claimed is:

1. A stripe projection system for three-dimensionally capturing a surface of a measurement object, the stripe projection system comprising:

a projector configured to project a stripe pattern onto the measurement object; and a digital camera configured to capture the stripe pattern, wherein the projector includes a binary amplitude mask having transparent and opaque regions, wherein the amplitude mask has first stripe regions which extend in a first direction and in which a proportion of the opaque and of transparent area proportions varies depending on a position in a second direction, wherein the proportion of the opaque and of transparent area proportions increases or decreases continuously over an extension of the respective first region in the second direction taking into account a resolution of the projection and camera optical units, wherein the first stripe regions each form a transition region between continuous opaque or transparent stripes extending in the first direction and alternate with these stripes in the second direction, wherein a width of the continuous opaque or transparent stripes in the second direction in an image captured by the digital camera substantially corresponds to the width of a pixel of the digital camera, and/or wherein the width of the continuous opaque or transparent stripes in the second direction is approximately 1/m of a period length of the stripe pattern, and wherein m is a number of pixels of the digital camera which capture a period of a projected intensity pattern in the second direction.

2. The stripe projection system according to claim 1, wherein the number m of pixels of the digital camera which capture a period of the projected intensity pattern in the second direction lies in a range of 3 to 20, and/or wherein a width of the continuous opaque or transparent stripes in the second direction is at least 1/m of the period length of the stripe pattern, and wherein m is less than or equal to 20, or less than or equal to 10.

3. The stripe projection system according to claim 1, wherein the transition regions are formed by the position of boundary lines between the continuous opaque and transparent stripes varying in the second direction in the region of the first stripe regions depending on the position in the first direction, wherein a variation of the position corresponds to a width of the first stripe regions, and wherein the boundary lines between the continuous opaque and transparent stripes in the region of the first stripe regions have a wave shape.

4. The stripe projection system according to claim 1, wherein the transition regions are formed by a pattern of discrete opaque or transparent elements being provided between the continuous opaque and transparent stripes, and wherein typically the area proportion of the opaque or transparent elements decreases or increases continuously in the second direction taking into account the resolution of the projection and camera optical units.

5. The stripe projection system according to claim 4, wherein mutually separate opaque or transparent elements are stripes or points, wherein the stripes extend in the first direction and have a thickness that becomes smaller or larger from stripe to stripe in the second direction, or wherein the points become smaller or larger in the second direction or a density of the points becomes smaller or larger in the second direction.

6. The stripe projection system according to claim 1, further comprising:

an evaluation unit configured to evaluate the stripe pattern captured by the digital camera, and determine the three-dimensional shape of the measurement object therefrom, wherein the evaluation is effected by a spatial phase shift.

7. The stripe projection system according to claim 1, further comprising:

a movement unit configured to guide the stripe projection system along that surface of the measurement object which is to be measured, wherein the movement unit includes a robotic arm.

8. A method for operating a stripe projection system according to claim 2, the method comprising:

projecting a stripe pattern onto a measurement object;

capturing the stripe pattern; and evaluating the captured stripe pattern, wherein the method is typically used for capturing surface defects and/or shape deviations of sheet metal parts, and/or wherein the captured stripe pattern are evaluated with a spatial phase shift, and/or wherein the stripe projection system is guided along the surface of the measurement object which is to be measured, to measure said measurement object.

9. A stripe projection system for three-dimensionally capturing a surface of a measurement object, the stripe projection system comprising:

a projector configured to project a stripe pattern onto the measurement object; and a digital camera configured to capture the stripe pattern, wherein the projector includes a binary amplitude mask having transparent and opaque regions, wherein the amplitude mask has first stripe regions which extend in a first direction and in which a proportion of the opaque and of transparent area proportions varies depending on a position in a second direction, wherein the proportion of the opaque and of transparent area proportions increases or decreases continuously over an extension of the respective first region in the second direction taking into account a resolution of the projection and camera optical units, wherein the first stripe regions each form a transition region between continuous opaque or transparent stripes extending in the first direction and alternate with these stripes in the second direction, and wherein as a result of a division of the stripe pattern into continuous opaque and transparent stripes and intervening transition regions together with a sampling rate of the digital camera and a resolution capability of the projection and camera optical units, locally a desired periodic intensity distribution is generated on a camera image with the maximum possible contrast.

10. The stripe projection system according to claim 9, wherein a periodic intensity distribution generated on the camera image is locally constant in the first direction and substantially a sine function in the second direction.

11. A method for operating a stripe projection system according to claim 9, the method comprising:

projecting a stripe pattern onto a measurement object;

capturing the stripe pattern; and evaluating the captured stripe pattern, wherein the method is typically used for capturing surface defects and/or shape deviations of sheet metal parts, and/or wherein the captured stripe pattern are evaluated with a spatial phase shift, and/or wherein the stripe projection system is guided along the surface of the measurement object which is to be measured, to measure said measurement object.

12. The stripe projection system according to claim 9, further comprising:

an evaluation unit configured to evaluate the stripe pattern captured by the digital camera, and determine the three-dimensional shape of the measurement object therefrom, wherein the evaluation is effected by a spatial phase shift.

13. The stripe projection system according to claim 9, further comprising:

a movement unit configured to guide the stripe projection system along that surface of the measurement object which is to be measured, wherein the movement unit includes a robotic arm.

14. The stripe projection system according to claim 9, wherein the transition regions are formed by a pattern of discrete opaque or transparent elements being provided between the continuous opaque and transparent stripes, and wherein typically the area proportion of the opaque or transparent elements decreases or increases continuously in the second direction taking into account the resolution of the projection and camera optical units.

15. A stripe projection system for three-dimensionally capturing a surface of a measurement object, the stripe projection system comprising:

a projector configured to project a stripe pattern onto the measurement object; and a digital camera configured to capture the stripe pattern, wherein the projector includes a binary amplitude mask having transparent and opaque regions, wherein the amplitude mask has first stripe regions which extend in a first direction and in which a proportion of the opaque and of transparent area proportions varies depending on a position in a second direction, wherein the proportion of the opaque and of transparent area proportions increases or decreases continuously over an extension of the respective first region in the second direction taking into account a resolution of the projection and camera optical units, wherein the first stripe regions each form a transition region between continuous opaque or transparent stripes extending in the first direction and alternate with these stripes in the second direction, wherein the binary amplitude mask is structured periodically or quasi-periodically in the first and the second direction by juxtaposition of basic cells, wherein the structure period in the first direction along the stripes of the stripe pattern is smaller than the resolution of the projection and camera optical units, wherein the basic cells are partly opaque and partly transparent over their height in the first direction in the first stripe region, and wherein the respective proportion varies depending on the position in the second direction.

16. The stripe projection system according to claim 15, wherein in the basic cell the opaque proportion in the first region varies continuously depending on the position in the second direction, from a proportion of 100% to a proportion of 0%, and has an arc-sinusoidal or arc-cosinusoidal profile.

17. The stripe projection system according to claim 15, wherein the binary amplitude mask is quasi-periodic and the alignment and/or period length varies over a grating and is thereby adapted to a respective projection geometry.

18. A method for operating a stripe projection system according to claim 15, the method comprising:

projecting a stripe pattern onto a measurement object;

capturing the stripe pattern; and evaluating the captured stripe pattern, wherein the method is typically used for capturing surface defects and/or shape deviations of sheet metal parts, and/or wherein the captured stripe pattern are evaluated with a spatial phase shift, and/or wherein the stripe projection system is guided along the surface of the measurement object which is to be measured, to measure said measurement object.

19. The stripe projection system according to claim 15, further comprising:

an evaluation unit configured to evaluate the stripe pattern captured by the digital camera, and determine the three-dimensional shape of the measurement object therefrom, wherein the evaluation is effected by a spatial phase shift.

20. The stripe projection system according to claim 15, further comprising:

a movement unit configured to guide the stripe projection system along that surface of the measurement object which is to be measured, wherein the movement unit includes a robotic arm.

* * * * *